United States Patent [19]

Quintus et al.

[11] Patent Number: 5,129,864
[45] Date of Patent: Jul. 14, 1992

[54] TENSIONER FOR A POWER TRANSMISSION BELT AND METHOD OF MAKING THE SAME

[75] Inventors: James G. Quintus; Mark P. Foley, both of Springfield, Mo.

[73] Assignee: Dayco Products, Inc., Dayton, Ohio

[21] Appl. No.: 771,291

[22] Filed: Oct. 4, 1991

Related U.S. Application Data

[62] Division of Ser. No. 661,141, Feb. 27, 1991, Pat. No. 5,083,984.

[51] Int. Cl.$^5$ .............................................. F16H 7/08
[52] U.S. Cl. ...................................... 474/135; 474/117
[58] Field of Search ........................ 474/101, 109–111, 474/113–117, 133–135

[56] References Cited

U.S. PATENT DOCUMENTS

| | | | |
|---|---|---|---|
| 4,596,538 | 6/1986 | Henderson | 474/135 |
| 4,784,631 | 11/1988 | Henderson | 474/135 |
| 4,971,589 | 11/1990 | Sidwell et al. | 474/117 X |
| 4,985,010 | 1/1991 | Henderson | 474/135 |

Primary Examiner—Thuy M. Bui
Attorney, Agent, or Firm—Joseph V. Tassone

[57] ABSTRACT

A tensioner for a power transmission belt that is adapted to be operated in an endless path and a method of making the tensioner is provided, the tensioner comprising a support unit for being fixed relative to the belt, a belt engaging unit carried by the support unit and being movable relative thereto, a coiled torsion spring having a first end operatively interconnected to the support unit and a second end operatively interconnected to the belt engaging unit for urging the belt engaging unit relative to the support unit and against the belt with a force to tension the belt, the spring having a certain torque when the belt engaging unit is disposed at a certain position relative to the support unit, the tensioner having changeable structure holding one of the ends in an adjusted position relative to its respective operatively interconnected unit so as to provide for the certain torque of the spring when the belt engaging unit is disposed at the certain position relative to the support unit.

8 Claims, 7 Drawing Sheets

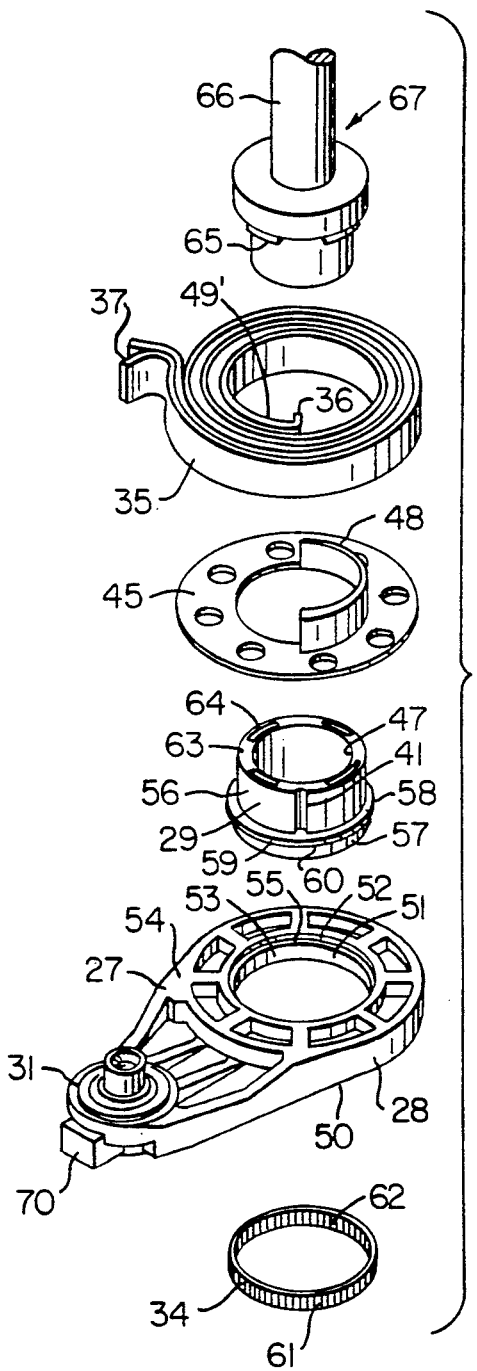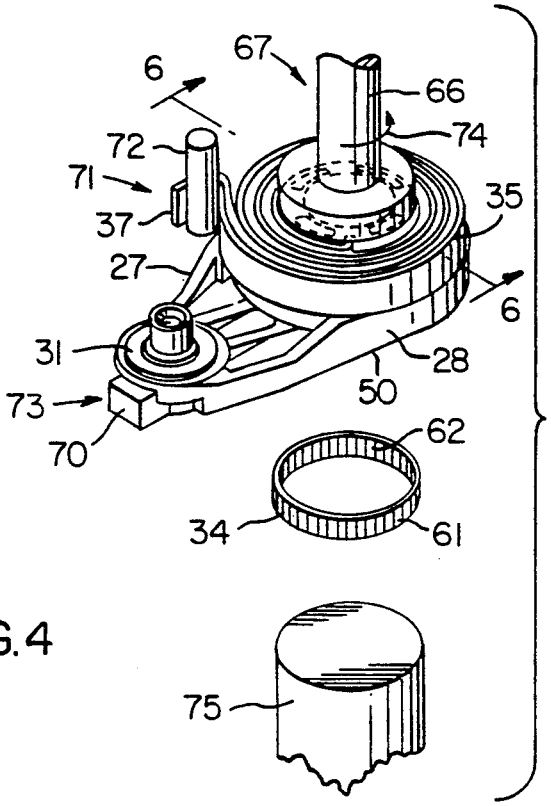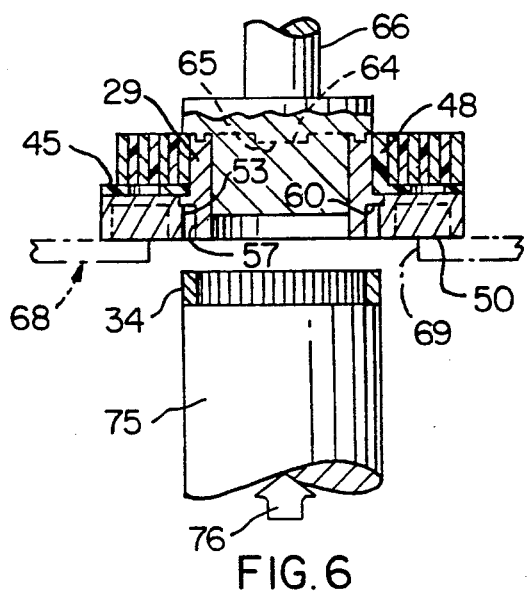
FIG. 4
FIG. 5
FIG. 6

5,129,864

1

TENSIONER FOR A POWER TRANSMISSION BELT AND METHOD OF MAKING THE SAME

CROSS REFERENCE TO RELATED APPLICATIONS

This application is a divisional patent application of its copending parent patent application, Ser. No. 661,141, filed Feb. 27, 1991 now U.S. Pat. No. 5,083,984.

BACKGROUND OF THE INVENTION

1. Field of the Invention

This invention relates to a new tensioner for a power transmission belt that is adapted to be operated in an endless path and to a new method of making such a tensioner.

2. Prior Art Statement

It is known to provide a tensioner for a power transmission belt that is adapted to be operated in an endless path, the tensioner comprising a support means for being fixed relative to the belt, a belt engaging means carried by the support means and being movable relative thereto, a coiled torsion spring having a first end operatively interconnected to the support means and a second end operatively interconnected to the belt engaging means for urging the belt engaging means relative to the support means and against the belt with a force to tension the belt, the spring having a certain torque when the belt engaging means is disposed at a certain position relative to the support means. For example, see the U.S. Pat. No. 4,596,538 to Henderson.

SUMMARY OF THE INVENTION

It is one of the features of this invention to provide a new belt tensioner that has unique means for adjusting the torque of the torsion spring thereof to a desired torque when the belt engaging means thereof is disposed at a certain position relative to the support means thereof.

In particular, it was found according to the teachings of this invention that the tensioner can be provided with changeable structure for holding one of the ends of the spring in an adjusted position relative to its respective operatively interconnected part of the tensioner so as to provide for a certain torque of the spring when the belt engaging means is disposed at a certain position relative to the support means.

For example, one embodiment of this invention comprises a tensioner for a power transmission belt that is adapted to be operated in an endless path, the tensioner comprising a support means for being fixed relative to the belt, a belt engaging means carried by the support means and being movable relative thereto, a coiled torsion spring having a first end operatively interconnected to the support means and a second end operatively interconnected to the belt engaging means for urging the belt engaging means relative to the support means and against the belt with a force to tension the belt, the spring having a certain torque when the belt engaging means is disposed at a certain position relative to the support means, the tensioner having changeable structure holding one of the ends in an adjusted position relative to its respective operatively interconnected means so as to provide for the certain torque of the spring when the belt engaging means is disposed at the certain position relative to the support means.

Accordingly, it is an object of this invention to provide a new tensioner for a power transmission belt that is adapted to be operated in an endless path, the tensioner of this invention having one or more of the novel features of this invention as set forth above or hereinafter shown or described.

Another object of this invention is to provide a new method for making a tensioner for a power transmission belt that is adapted to be operated in an endless path, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 4 is an exploded perspective view illustrating various parts for setting the torque of the spring of the tensioner of this invention during the method of making the tensioner according to the method of this invention.

FIG. 5 is a view similar to FIG. 4 illustrating certain of the parts in their assembled relation.

FIG. 6 is a side view of the parts illustrated in FIG. 5 with part of the structure being taken on line 6—6 of FIG. 5.

DESCRIPTION OF THE PREFERRED EMBODIMENTS

Figure 1:
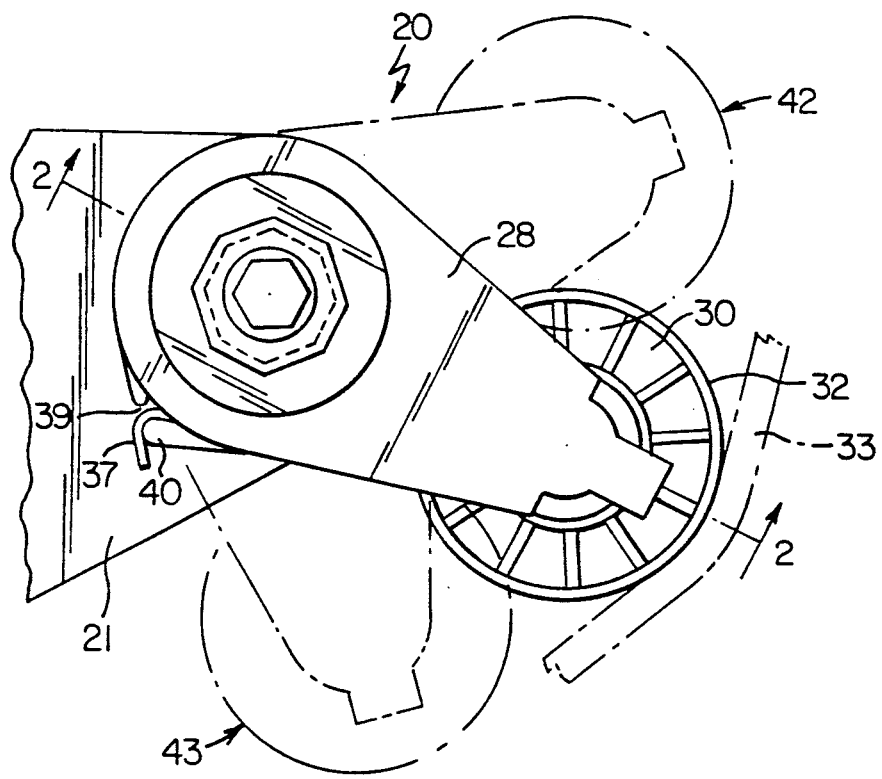
FIG. 1 is a fragmentary front view of the belt tensioner of this invention mounted to a support bracket and illustrating in full lines one position thereof and in phantom lines other positions thereof.

While the various features of this invention are hereinafter illustrated and described as being particularly adapted to provide a tensioner for a certain type of power transmission belt, it is to be understood that the various features of this invention can be utilized singly or in various combinations thereof to provide a tensioner for other types of belts as desired.

Therefore, this invention is not to be limited to only the embodiments illustrated in the drawings because the drawings are merely utilized to illustrate one of a wide variety of uses of this invention.

Figure 2:
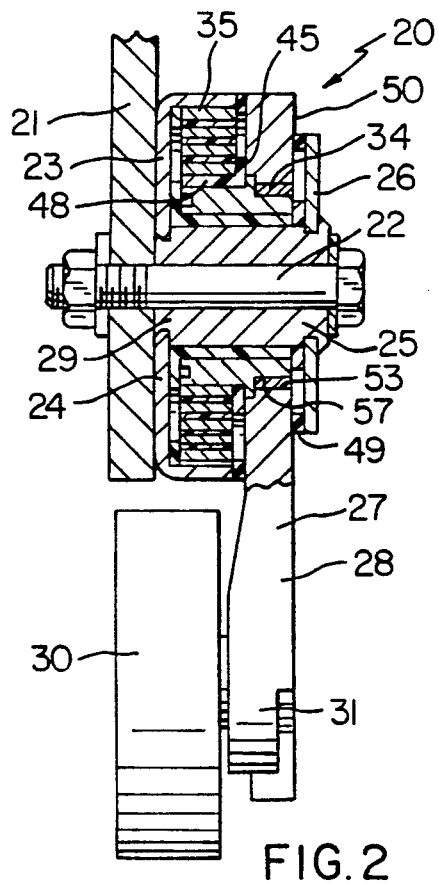
FIG. 2 is a fragmentary cross-sectional view taken on line 2—2 of FIG. 1

Referring now to FIGS. 1 and 2, the new belt tensioner of this invention is generally indicated by the reference numeral 20 and is illustrated as being interconnected to a support bracket 21 of an internal combustion engine (not shown) by a single bolt means 22 in a manner fully set forth in the aforementioned U.S. Pat. No. 4,661,087 to Henderson, whereby this patent is being incorporated into this disclosure by this reference thereto. Of course, other mounting means can be used.

The tensioner 20 comprises a support means 23 that comprises a cup-shaped casing 24, a shaft means 25 and a plate means 26 all interconnected together so that when the support means 23 is interconnected to the support bracket 21, the support means 23 remains stationary with the support bracket 21 as is well known in the art.

The tensioner 20 also comprises a belt engaging means 27 that comprises an arm 28 that is provided with a tubular arbor 29 that is rotatably disposed on the shaft means 25 so as to pivotally mount the belt engaging arm 28 to the shaft means 25, the belt engaging means 27 further comprising a pulley means 30 that is rotatably mounted to an end 31 of the belt engaging arm 28 so that an outer peripheral surface 32 of the pulley 30 can engage against a power transmission belt that is adapted to be operated in an endless path relative to the support bracket 21. Such a belt construction 33 is illustrated in phantom lines in FIG. 1.

The tubular arbor 29 of the belt engaging means 27 of this invention is a part that is initially separate from the belt engaging arm 28 but is subsequently secured thereto by a locking ring 34 in a manner hereinafter set forth so that the arbor 29 and arm 28 will rotate in unison whereas the arbor of the belt tensioner set forth in the aforementioned U.S. Pat. No. 4,661,087 to Henderson, is integral and one-piece with the belt engaging arm.

The tensioner 20 also comprises a coiled torsion spring 35 formed from a flat metallic ribbon coiled upon itself so as to have an inner end 36 and an outer end 37. Also an antifriction ribbon 38 is interleaved between the coils of the spring 35 to reduce friction of such coils during the winding and unwinding thereof in a manner well known in the art. The spring 35 is disposed in the cup-shaped casing 24 with the outer end 37 of the spring 35 extending through a slot 39 in the cup-shaped casing 24 and hooking against a surface 40 thereof so as to interconnect the end 37 of the spring 35 to the support means 23. The inner end 36 of the spring 35 is tang-like and is received in a slot 41, FIG. 4, of the arbor 29 of the belt engaging means 27 so as to interconnect the spring 35 to the belt engaging means 27.

When the tensioner 20 is assembled in a manner hereinafter set forth, the torsion spring 35 has been so wound that the same tends to move the belt engaging arm 28 in a clockwise direction in FIG. 1 from the phantom line position indicated by the reference numeral 42 in FIG. 1 to the phantom line position represented by the reference numeral 43 in FIG. 1 so that the pulley 30 will engage against the belt 33 at the position indicated by the solid line to impose a tensioning force on the belt 33 in a manner well known in the art.

In the past, each spring 35 was so constructed and arranged that when the same was assembled in a tensioner the same was to provide a certain torque on the belt engaging means when the belt engaging arm was disposed at a certain position relative to the support means and therefore would provide for proper tensioning of a belt during the use thereof. However, it was found according to the teachings of this invention that inconsistent spring torque makes keeping tensioner torque output within the required tolerances for each different type of engine use very difficult whereby spring sorting by torque output and selective assembly of the tensioners are costly and produce high spring scrap rates.

Therefore, it was found according to the teachings of this invention that the tensioner 20 can be provided with changeable structure that holds one of the ends of the spring in an adjusted position relative to its respective operatively interconnected means so as to provide for a certain torque of the spring when the belt engaging means is disposed at a certain position thereof relative to the support means and in the embodiment of the tensioner 20 of this invention illustrated in FIGS. 1-7, such changeable structure is provided by the arbor 29 of the belt engaging means 27 initially being separate from the belt engaging arm 28 in a manner hereinafter set forth.

In order to provide antifriction material on each side of the torsion spring 35 when the same is disposed in the cup-shaped casing 23 in the assembled relation therewith, a pair of disc-like members 44 and 45 are provided and are disposed on opposite sides of the spring 35, the disc-like member 44 having a tubular bearing structure 46 that is disposed between the shaft means 25 and the inner peripheral surface 47 of the arbor 29 of the belt engaging means 27 so as to provide friction material between the shaft means 25 and the pivoting movement of the arm 28 in a manner well known in the art. The disc-like member 45 has a partial tubular structure 48 that is disposed adjacent the inner coil 49' of the spring 35 for the reasons fully set forth in the aforementioned U.S. Pat. No. 4,596,538 to Henderson, whereby a further discussion of the disc-like members 44 and 45 is deemed unnecessary as the details of the members 44 and 45 are fully disclosed in such patent.

Additionally, a disc-like member 49 of polymeric material is disposed between the end plate 26 and the side 50 of the belt engaging arm 28 to reduce friction between the pivoting movement of the arm 28 and the stationary end plate 26.

Thus, since the details of the structure and the operation of the belt tensioner 20 are similar to the belt tensioner fully disclosed in the aforementioned U.S. Pat. No. 4,661,087, to Henderson, a further discussion of the structure and operation of the belt tensioner 20 of this invention is deemed unnecessary.

Therefore, the aforementioned feature of this invention for adjusting the torque of the spring 35 during the assembly of the tensioner 20 will now be described in detail.

Figure 3:
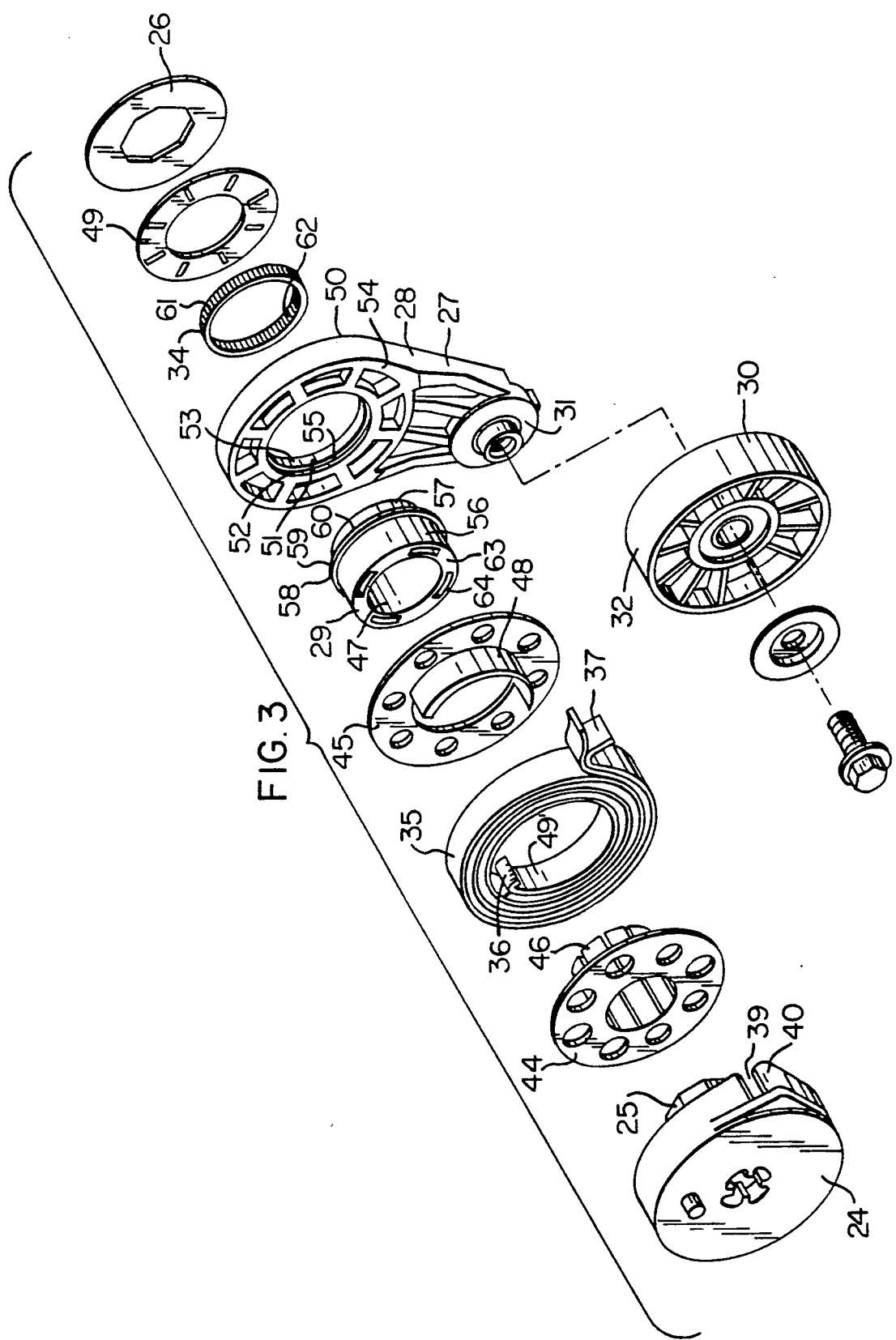
FIG. 3 is an exploded perspective view of the various parts of the tensioner of FIGS. 1 and 2.

The arm 28 of the tensioner 20 is formed of metallic material and has a stepped opening 51 passing therethrough and defining a first cylindrical surface 52 and a second cylindrical surface 53 respectively adjacent the opposed sides 54 and 50 of the arm 28 while defining a flat internal annular shoulder 55 therebetween as illustrated in FIG. 3.

The arbor 29 is formed of metallic material and has a stepped external peripheral surface defined by a first external cylindrical surface 56 and a second external cylindrical surface 57 that has a smaller diameter than the surface 56 and being separated therefrom by an outwardly directed annular rib means 58 that is adapted to have its outer peripheral surface 59 substantially mate with the cylindrical surface 52 of the arm 28 when the same is disposed therein and have a flat annular shoulder 60 engage against the annular shoulder 55 of the arm 28 in the manner illustrated in FIG. 2 whereby the peripheral surface 57 of the arbor 29 is disposed spaced radially inwardly from the internal peripheral surface 53 of the arm 28.

When the arbor 29 is first assembled in the opening 51 of the arm 28 in the above manner, the arbor 29 can be rotated relative to the arm 28 and can be subsequently locked in a desired rotational position thereof by having the knurled metallic ring 34, which has knurls 61 on the outer peripheral surface thereof and knurls 62 on the inner peripheral surface thereof, inserted between the surfaces 53 and 57 of the arm 28 and arbor 29 so that the knurls 61 and 62 thereof grip in a manner well known in the pressfit art the respective surfaces 53 and 57 to lock the arbor 29 to the arm 28 in such rotational position thereof so that thereafter the arm 28 and arbor 29 rotate in unison in that selected rotational position of the arbor 29 relative to the arm 28.

The arbor 29 has an end surface 63 provided with a plurality of openings 64 disposed therein to cooperate with a plurality of projections 65 on a rotatable tool 66 of an apparatus of this invention that is generally indicated by the reference numeral 67 in the drawings.

The apparatus 67 includes a support structure that is generally indicated by the reference numeral 68 in FIG. 6 and represented by dashed lines, the support structure 68 having an opening 69 passing therethrough.

The arm 28 of a tensioner 20 is adapted to be disposed on the support structure 68 in the manner illustrated in FIG. 6 so that the opening 51 thereof is aligned with the opening 69. The arm 28 is adapted to be held on such structure 68 in a fixed manner by any suitable holding structure (not shown) so that the end 70 of the arm 28 will be located in a fixed position on the support structure 68 for a purpose hereinafter set forth.

Thereafter, the arbor 29 is inserted into the opening 51 so that the shoulder 60 thereof abuts against the annular shoulder 55 of the arm 28. Thereafter, the disc member 45 is assembled over the arbor 29 and then the spring 35 is disposed over the arbor 29 and against the disc 45 with the inner end 36 of the spring 35 being received in the notch 41 of the arbor 29.

The end 37 of the spring 35 is then moved to a set position that is represented by the reference numeral 71 in FIG. 5 by a holding pin 72 of the apparatus 67 so that the end 37 of the spring 35 is in the fixed position 71 relative to the fixed position 73 for the end 70 of the belt engaging arm 28 in the manner illustrated in FIG. 5.

Figure 7:
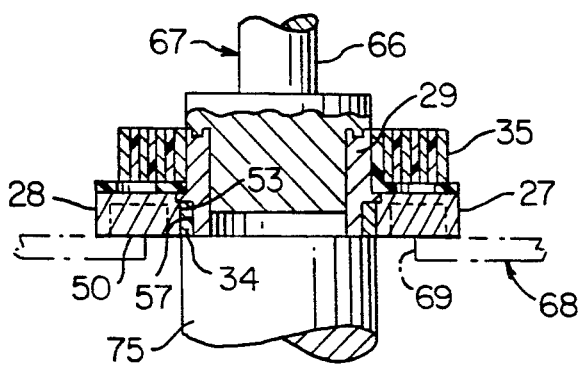
FIG. 7 is a view similar to FIG. 6 and illustrates the method of this invention for locking the tensioner in the adjusted position thereof.

With the end 37 of the spring 35 held at the position 71 and the end 70 of the arm 28 held at the position 73 as illustrated in FIG. 5, the tool 66 is lowered against the arbor 28 so that the projections 65 are received in the openings 64 whereby the tool 66 can rotate the arbor 29 in the direction indicated by the arrow 74 in FIG. 5 in the manner illustrated in FIG. 6 to create a windup force of the spring 35 so that a desired output torque for the spring 35 will eventually be reached for the settings 71 and 73 at which time the rotation of the tool 66 is terminated. While the tool 66 and thus the arbor 29 is being held in that position, a ram 75 of the apparatus 67 is moved upwardly as represented by the arrow 76 in FIG. 6 to insert the locking ring 34 through the opening 69 of the support means 68 and into the space between the surfaces 53 and 57 of the arm 28 and the arbor 29 to lock the arbor 29 in the set rotational position as being held by the tool 66 as illustrated in FIG. 7.

Thereafter, the assembled arm 28, spring 35 and arbor 29 can be removed from the apparatus 67 as a completed subassembly by backing off the tool 66 and the ram 75 whereby such subassembly can then be assembled with the other parts of the tensioner 20 to complete the same in the manner fully set forth in the aforementioned U.S. Pat. No. 4,596,538 to Henderson, and the torque of the spring 35 will be at an adjusted setting thereof that will assure that when the belt engaging arm 28 is disposed in a certain position relative to the support means 23, the spring 35 will provide a desired torque for tensioning a belt when the tensioner 20 is utilized in the manner illustrated in FIG. 1.

In this manner, it can be seen that the springs 35 for the tensioners 20 of this invention need not be substantially identical to each other when forming the tensioners 20 of this invention because the apparatus 67 will assure that when each spring 35 is in the assembled relation illustrated in FIG. 4 wherein the end 37 of the spring 35 is at the position 71 and the end 70 of the arm 28 is held at the position 73, the tool 66 can adjust the inner end 36 of the spring 35 to a certain position that will provide a desired specified torque at which time the arbor 29 is then locked in place in such rotational position provided by the tool 66.

While the locking ring 34 is utilized to lock the arbor 29 in the desired rotational position in the opening 51 of the arm 28 in the manner previously set forth, it is to be understood that other locking arrangements can be utilized.

For example, the surface 57 of the arbor 29 could itself be knurled so that when the same is fully inserted into the arm 28, such knurls will lock with the surface 53 in the arm 28.

Figure 8:
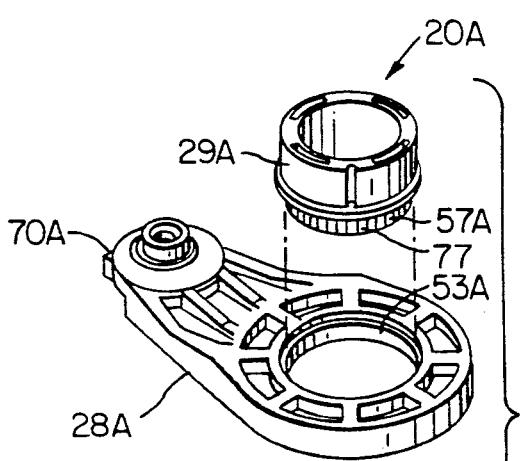
FIG. 8 is an exploded perspective view illustrating another embodiment of the tensioner of this invention.
Figure 9:
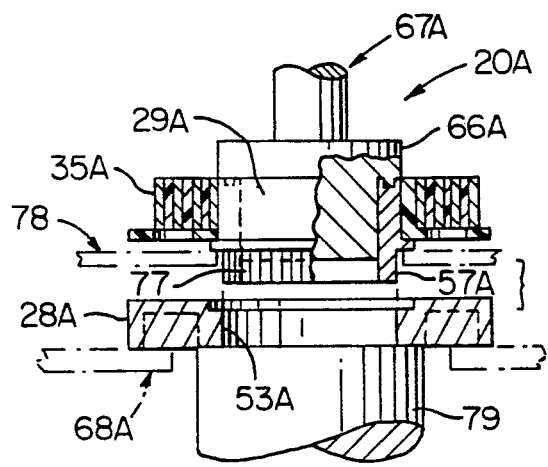
FIG. 9 is a side view of the parts of FIG. 8 in a certain assembled relation thereof.
Figure 10:
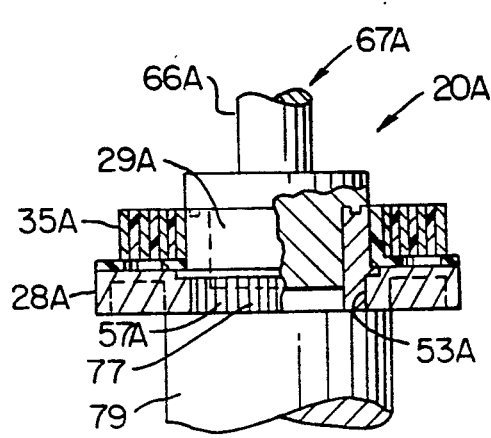
FIG. 10 is a view similar to FIG. 9 and illustrates the parts in their locked position.
Figure 11:
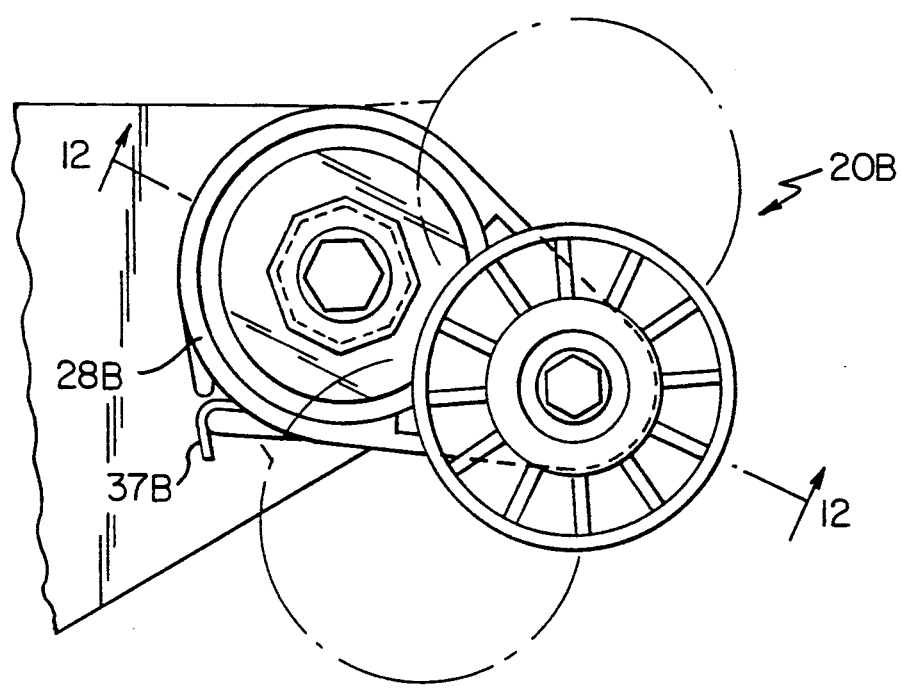
FIG. 11 is a view similar to FIG. 1 and illustrates another tensioner of this invention.
Figure 12:
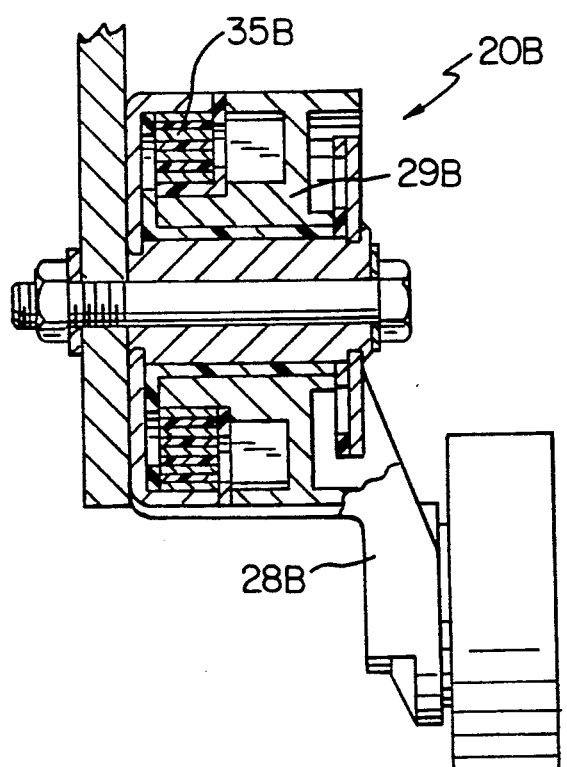
FIG. 12 is a fragmentary cross-sectional view taken on line 12—12 of FIG. 11.
Figure 13:
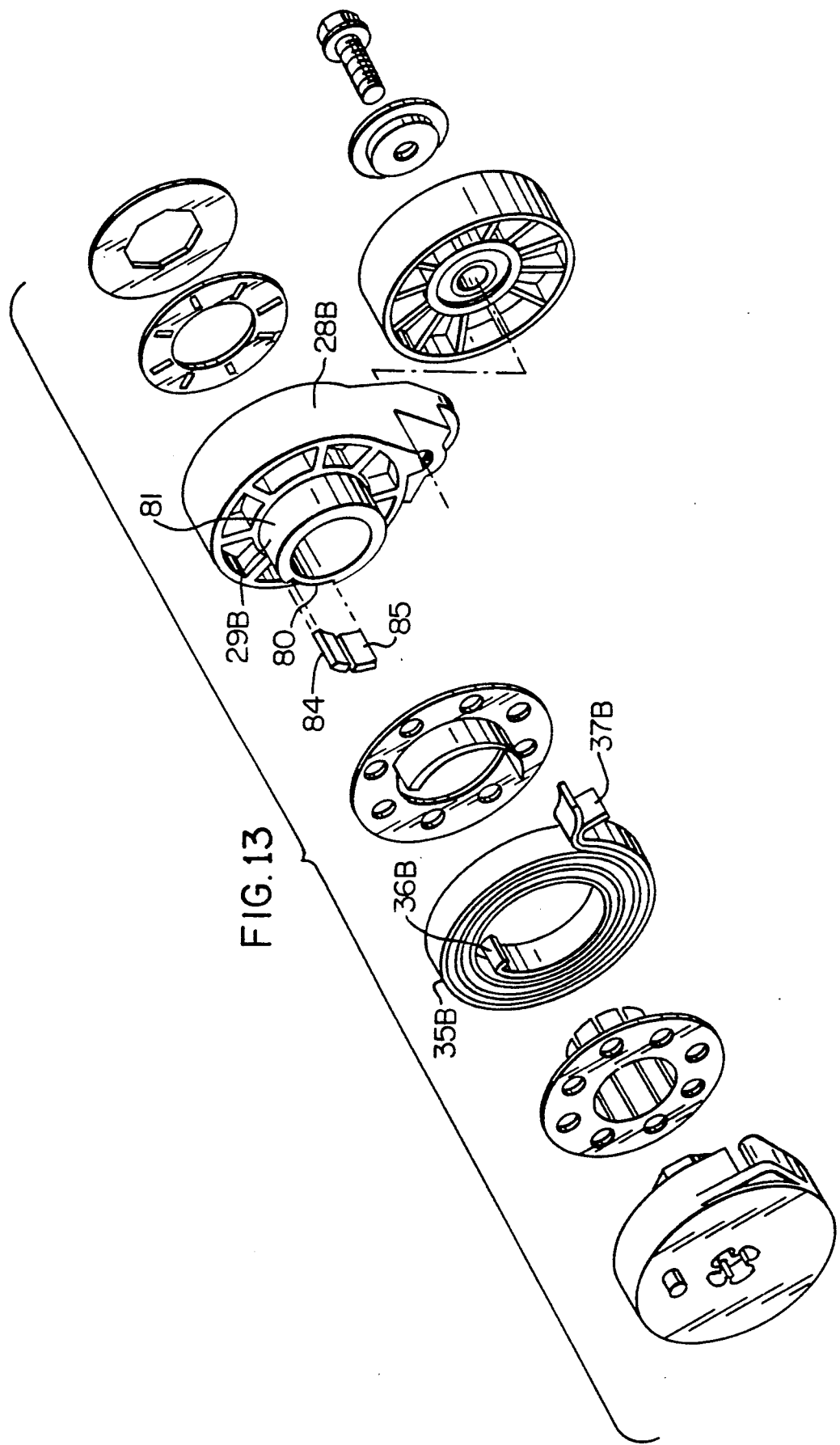
FIG. 13 is an exploded perspective view of the various parts that form the tensioner of FIGS. 11 and 12.
Figure 14:
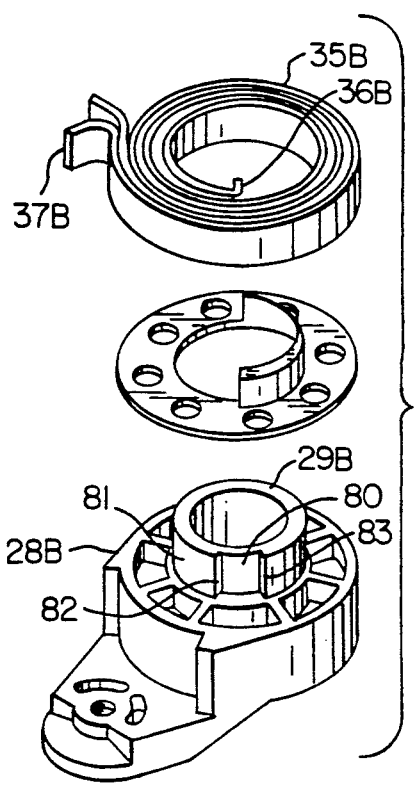
FIG. 14 is an exploded perspective view of certain of the parts of the tensioner of FIGS. 11 and 12 and illustrates one of the steps of the method of this invention for making the tensioner of FIGS. 11 and 12.

In particular, another tensioner of this invention is generally indicated by the reference numeral 20A in FIGS. 8–10 and parts thereof similar to the tensioner 20 previously described are indicated by like reference numerals followed by the reference letter "A".

As illustrated in FIGS. 8–10, the arm 28A is identical to the arm 28 previously described while the arbor 29A has the surface 57A thereof provided with knurls 77 which will dig into the surface 53A of the arm 28A when the arbor 29A is fully inserted down into the opening 51A of the arm 28A in the manner illustrated in FIG. 10 to lock the arbor 29A in its rotational position relative to the arm 28A.

Thus, the apparatus 67A of this invention can be so constructed and arranged that initially the arm 28A will be held on the supporting structure 68A with the end 70A thereof held in a certain position and the arbor 29A will be held adjacent to the arm 28A by another supporting structure 78 of the apparatus 67A so that the tool 66A could rotate the arbor 29A to a desired rotational position thereof that will provide the torque output of the spring 35A when the outer end 37A of the spring 35A is being held in a certain position relative to the end 70A of the arm 28A in the manner previously set forth so that a ram 79 of the apparatus 67A can then cooperate with the tool 66A to force the arm 28A and arbor 29A together in the manner illustrated in FIG. 10 after the removal of the supporting structure 78 whereby the knurls 77 on the surface 57A of the arbor 29A will dig into the surface 53A of the arm 28A and thereby lock the same together in the rotational position that will cause the torque output of the spring 35A to be at the desired torque output in the same manner as provided by the apparatus 67 when utilizing the locking ring 34 previously set forth.

In order to ensure that the arbor 29A will lock in place, it may be found that the arbor 29A should be made out of a harder material than the arbor 29 so as to form stronger knurls 77 for the previously described locking function.

While the tensioners 20 and 20A previously described utilize arbors 29 and 29A that are initially separate from the respective belt engaging arm 28 and 28A, it is to be understood that other changeable structure can be utilized for changing the position of the inner end of the spring in its interconnection to the arbor of the belt engaging arm so as to adjust the torque output of the spring for the reasons previously set forth.

In particular, another tensioner of this invention is generally indicated by the reference numeral 20B in FIGS. 11-18 and parts thereof similar to the tensioners 20 and 20A previously described are indicated by like reference numerals followed by the reference letter "B".

It can be seen from FIGS. 11-18 that the tensioner 20B is generally identical to the tensioner 20 previously described except that the arbor 29B is integral and one-piece with the belt engaging arm 28B so that the arbor 29B cannot initially rotate relative to the arm 29B.

However, instead of the fixed arbor 29B having the narrow slot 41 previously described for the arbor 29, the arbor 29B is provided with a relatively wide notch 80 in an outer peripheral surface 81 thereof that defines facing shoulders 82 and 83 as illustrated.

Figure 15:
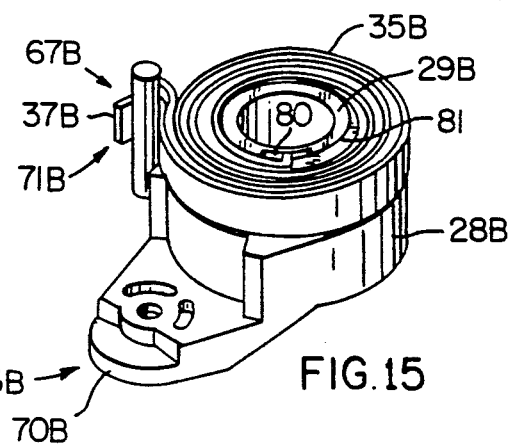
FIG. 15 is a perspective view of the parts of FIG. 14 in the assembled relation thereof.
Figure 17:
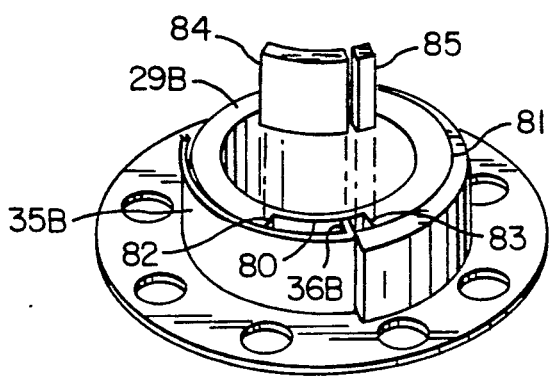
FIG. 17 is a view similar to FIG. 16 and illustrates the one end of the spring being disposed in an adjusted position thereof and illustrating the locking spacers therefor in an exploded manner.
Figure 16:
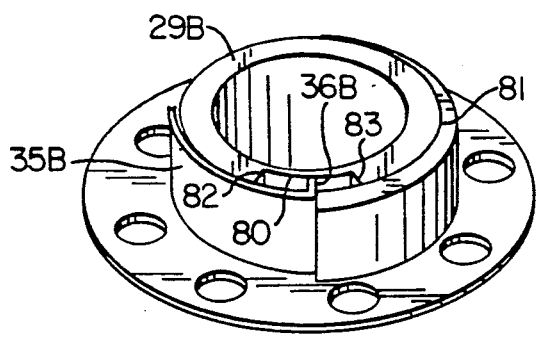
FIG. 16 is an enlarged fragmentary view of part of the assembled structure illustrated in FIG. 15.
Figure 18:
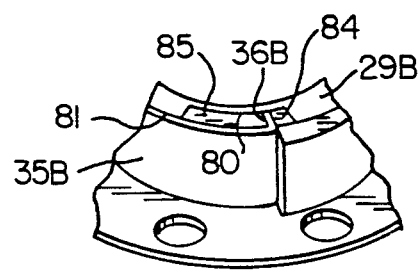
FIG. 18 is a view similar to FIG. 17 and illustrates the spacers of FIG. 17 in their inserted and final locking positions.

The apparatus 67B for assembling the spring 35B to the arm 28B is so arranged that the end 70B of the arm 28B is held at the position 73B as illustrated in FIG. 15 while the end 37B of the spring 35B is held at the position 71B by the rod 72B of the apparatus 67B whereby the inner end 36B of the spring 35B will be located in the notch 80 of the arbor 29B. Thereafter, the end 36B of the spring 35B is moved to a desired position within the notch 80 which will produce a certain torque output, such movement of the end 36B being by a tool similar to the tool 66 of the apparatus 67 except that the tool would only grasp the end 36B of the spring 35B and move the same to its desired torque output producing position which would be as illustrated in FIG. 17. Thus, at least one properly sized arcuate spacer 84 and/or 85 can then be disposed respectively into the notch 80 on opposite sides of the end 36B of the spring 35B and respectively engage against the edges 82 and 83 of the notch 80 and the end 36B of the spring 35B to hold the end 36B of the spring 35B in the properly selected position thereof to provide the desired output torque of the spring 35B while the end 37B of the spring 35B is at the position 71B and the end 70B of the arm 28B is at the position 73B.

Of course, for each different spring 35B, the end 36B thereof will be at a different position and different sizes of the spacers 84 and/or 85 will be utilized to hold that end 36B at the desired position thereof.

In that manner, the operator of the apparatus 67B will be provided with a plurality of different spacers 84 and/or 85 wherein the sizes of the spacers 84 and/or 85 will be such that the same will hold the end 36B of a spring 35B at a certain position within the notch 80 of the arbor 29B of a belt engaging arm 28B.

Therefore, it can be seen that the tensioner 20B of this invention has changeable structure holding one of the ends of the springs in an adjusted position relative to its respective operatively interconnected means so as to provide for a certain torque of the spring when the belt engaging means is disposed at a certain position relative to the support means.

While the various embodiments of the tensioner of this invention each have the inner end of the torsion spring adjusted by changeable structure, it is to be understood that the other end of the spring could be changed by changeable structure during its interconnection with the support means, if desired. Additionally both ends of the spring could be provided with changeable structure, if desired.

Therefore, it can be seen that this invention provides a new tensioner for a power transmission belt that is adapted to be operated in an endless path and provides a new method of making such a tensioner.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a tensioner for a power transmission belt that is adapted to be operated in an endless path, said tensioner comprising a support means for being fixed relative to said belt, a belt engaging means carried by said support means and being movable relative thereto, a coiled torsion spring having a first end operatively interconnected to said support means and a second end operatively interconnected to said belt engaging means for urging said belt engaging means relative to said support means and against said belt with a force to tension said belt, said spring having a certain torque when said belt engaging means is disposed at a certain position relative to said support means, the improvement wherein said tensioner has changeable structure holding one of said ends in an adjusted position relative to its respective operatively interconnected means so as to provide for said certain torque of said spring when said belt engaging means is disposed at said certain position relative to said support means, said changeable structure comprising a spacer carried by one of said support means and said belt engaging means, said one of said ends of said spring being disposed against said spacer so as to be interconnected to said one of said support means and said belt engaging means.

2. A tensioner as set forth in claim 1 wherein said changeable means comprises a pair of spacers carried in spaced apart relation by one of said support means and said belt engaging means so as to define a slot therebetween, said one of said ends of said spring being disposed in said slot so as to be interconnected to said one of said support means and said belt engaging means.

3. A tension as set forth in claim 1 wherein said one of said support means and said belt engaging means has a notch therein that defines two spaced apart edge means, said spacer being disposed against one of said two edge means so as to be carried in said notch.

4. A tensioner as set forth in claim 1 wherein said second end of said spring comprises an inner end thereof and wherein said one of said support means and said belt engaging means comprises said belt engaging means.

5. In a method of making a tensioner for a power transmission belt that is adapted to be operated in an endless path, said tensioner comprising a support means for being fixed relative to said belt, a belt engaging means carried by said support means and being movable relative thereto, a coiled torsion spring having a first end operatively interconnected to said support means and a second end operatively interconnected to said belt engaging means for urging said belt engaging means relative to said support means and against said belt with a force to tension said belt, said spring having a certain torque when said belt engaging means is disposed at a certain position relative to said support means, the improvement comprising steps of forming said tensioner to have changeable structure holding one of said ends in an adjusted position relative to its respective operatively interconnected means so as to provide for said certain torque of said spring when said belt engaging means is disposed at said certain position relative to said support means, forming said changeable structure to comprise a spacer carried by one of said support means and said belt engaging means, and disposing said one of said ends of said spring against said spacer so as to be interconnected to said one of said support means and said belt engaging means.

6. A method of making a tensioner as set forth in claim 5 and including the steps of forming said changeable means to comprise a pair of spacers carried in spaced apart relation by one of said support means and said belt engaging means so as to define a slot therebetween, and disposing said one of said ends of said spring in said slot so as to be interconnected to said one of said support means and said belt engaging means.

7. A method of making a tensioner as set forth in claim 5 and including the steps of forming said one of said support means and said belt engaging means to have a notch therein that defines two spaced apart edge means, and disposing said spacer against one of said two edge means so as to be carried in said notch.

8. A method of making a tensioner as set forth in claim 5 and including the step of forming said second end of said spring to comprise an inner end thereof, said one of said support means and said belt engaging means comprising said belt engaging means.

* * * * *